(12) United States Patent
Watanabe et al.

(10) Patent No.: US 7,241,555 B2
(45) Date of Patent: Jul. 10, 2007

(54) OPTICAL INFORMATION RECORDING MEDIUM AND METHOD FOR RECORDING INFORMATION

(75) Inventors: Tetsuya Watanabe, Kanagawa (JP); Masaki Okazaki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 193 days.

(21) Appl. No.: 10/633,707

(22) Filed: Aug. 5, 2003

(65) Prior Publication Data

US 2004/0029040 A1 Feb. 12, 2004

(30) Foreign Application Priority Data

Aug. 5, 2002 (JP) ............... 2002-227531

(51) Int. Cl.
*G11B 7/24* (2006.01)
(52) U.S. Cl. ............... 430/270.18; 430/945; 428/64.8; 369/284
(58) Field of Classification Search ............ 430/270.18
See application file for complete search history.

(56) References Cited

U.S. PATENT DOCUMENTS

| | | | | |
|---|---|---|---|---|
| 4,900,648 | A | * 2/1990 | Hioki et al. | 430/270.19 |
| 4,943,515 | A | * 7/1990 | Okazaki et al. | 430/270.11 |
| 4,977,076 | A | * 12/1990 | Okazaki et al. | 430/583 |
| 5,202,221 | A | * 4/1993 | Imai et al. | 430/283.1 |
| 6,683,188 | B1 | * 1/2004 | Kasada et al. | 548/181 |
| 2003/0031954 | A1 | * 2/2003 | Kakuta et al. | 430/270.2 |
| 2003/0175616 | A1 | * 9/2003 | Berneth et al. | 430/270.1 |
| 2004/0029040 | A1 | * 2/2004 | Watanabe et al. | 430/270.17 |
| 2004/0257973 | A1 | * 12/2004 | Berneth et al. | 369/275.5 |

FOREIGN PATENT DOCUMENTS

| | | | |
|---|---|---|---|
| GB | 1 418 963 | * | 12/1975 |
| JP | 60-239948 | * | 11/1985 |
| JP | 63-288786 | * | 11/1988 |
| JP | 01-205130 | * | 8/1989 |
| JP | 04-74690 A | | 3/1992 |
| JP | 04-338759 | * | 11/1992 |
| JP | 05-305772 | * | 11/1993 |
| JP | 07-304256 A | | 11/1995 |
| JP | 07-304257 A | | 11/1995 |
| JP | 8-127174 A | | 5/1996 |
| JP | 9-058130 A | | 3/1997 |
| JP | 10/222875 | * | 8/1998 |
| JP | 11-053758 A | | 2/1999 |
| JP | 11-078239 A | | 3/1999 |
| JP | 11-334204 A | | 12/1999 |
| JP | 11-334205 A | | 12/1999 |
| JP | 11-334206 A | | 12/1999 |
| JP | 11-334207 A | | 12/1999 |
| JP | 2000-43423 A | | 2/2000 |
| JP | 2000-108513 A | | 4/2000 |
| JP | 2000-113504 A | | 4/2000 |
| JP | 2000-149320 A | | 5/2000 |
| JP | 2000-158818 A | | 6/2000 |
| JP | 2000-228028 A | | 8/2000 |
| JP | 2001-039034 A | | 2/2001 |
| JP | 2001-253171 A | | 9/2001 |

OTHER PUBLICATIONS

English translaition of Kurokawa.*
English translaition of Hirano.*
English translation of abstract of Okazaki.*
Notice of Reasons for Rejection, Japanese Patent Application No.. 2002-227531, issued by the Japanese Patent Office on Apr. 25, 2006.

* cited by examiner

*Primary Examiner*—Martin Angebrannd
(74) *Attorney, Agent, or Firm*—Sughrue Mion, PLLC

(57) ABSTRACT

The present invention provides an optical information recording medium including a substrate; and a recording layer provided onto the substrate, to which information can be recorded and from which the information can be replayed by irradiating the medium with a laser having a short wavelength, specifically a highly versatile semiconductor laser having a wavelength near 405 nm, wherein the recording layer includes a specific compound, and the recording medium has superior recording properties. An information recording method capable of recording information at high density using a laser having a short wavelength is also provided.

13 Claims, No Drawings

OPTICAL INFORMATION RECORDING MEDIUM AND METHOD FOR RECORDING INFORMATION

CROSS-REFERENCE TO RELATED APPLICATIONS

This application claims benefit of and priority to Japanese Patent Application No. 2002-227531, filed on Aug. 5, 2002, which is incorporated herein by reference in its entirety for all purposes.

BACKGROUND OF THE INVENTION

1. Field of Invention

The present invention relates to an optical information recording medium on which information can be recorded and from which the information can be replayed by a laser, and a method for recording information. Specifically, the invention relates to a heat-mode optical information recording medium suitable for recording information with a laser having short wavelength of no more than 440 nm.

2. Description of the Related Art

Conventionally, an optical information recording medium (an optical disk) on which information can be recorded only once by a laser has been known. This optical disk is also referred to as a write-once CD (so-called a CD-R), and the typical constitution thereof comprises a transparent disc-shaped substrate, as well as a recording layer consisting of an organic dye, a light reflecting layer consisting of a metal such as gold and the like and a protective layer made of a resin, wherein these layers are provided onto the substrate in this order to form a laminate. The recording of information on the CD-R is carried out by irradiating a near-infrared laser (generally a laser having a wavelength of near 780 nm) on the CD-R, whereby the irradiated portion of the recording layer absorbs the beam, raises the temperature locally, which causes a physical or chemical change (for example, formation of a pit) to allow changing the optical properties of the portion. Thus, the information is recorded thereon.

In contrast to the above, reading (replaying) of the information on the CD-R is also carried out by irradiating a laser having the same wavelength as that for recording. The information is replayed by detecting the difference between the reflectance for the portion in which the optical properties of the recording layer has been changed (recorded portion) and that of the unchanged portion (unrecorded portion).

Recently, an optical information recording medium on which information can be recorded at high density has been required. In response to the request, an optical disk referred to as a write-once digital versatile disk (so-called a DVD-R) has been proposed (for example, "DVD", that is a supplemental volume of "Nikkei New Media", published in 1995). This DVD-R has a constitution in which two disks each comprising a transparent disc-shaped substrate on which a guide groove (a pr groove) for tracking the irradiated laser has been formed, which groove is half or less as narrow as that of a CD-R (0.74 to 0.8 µm), a recording layer comprising a dye provided onto the substrate, a light reflecting layer generally provided onto the recording layer, and optionally a protective layer, have been adhered by an adhesive, or a constitution in which the above-mentioned disk and a disc-shaped protective substrate having the same shape as that of the disk have been adhered by an adhesive, and in both constitution, the side in which the recording layer(s) have been provided is (are) facing inside. The recording and replaying of the information on the DVD-R is carried out by irradiating a visible laser (generally a laser having a wavelength of 630 nm to 680 nm), which is said to be capable of being recorded in higher density than that for the CD-R.

Recently, networks such as Internet and the like, a Hi-Vision TV, and the like have rapidly come into wide use. Furthermore, a HDTV (High Definition Television) will start to air in the near future. Thus, demands for a recording medium having large capacity for recording image information cheaply and easily have been increased. While a DVD-R keeps the post as a recording medium having large capacity to some extent, it does not necessarily have sufficiently large capacity that can deal with the future demands. Therefore, developments for an optical disk having even larger capacity are now proceeding, by using a laser having shorter wavelength than that for a DVD-R to allow improvement in recording density.

For example, Japanese Patent Application Laid-Open (JP-A) Nos. 4-74960, 7-304256, 7-304257, 8-127174, 11-53758, 11-334204, 11-334205, 11-334206, 11-334207, 2000-43423, 2000-108513, 2000-113504, 2000-149320, 2000-158818, 2000-228028, 2001-39034 and 2001-253171 disclose methods for recording and replaying information on an optical information recording medium having a recording layer comprising an organic dye, comprising irradiating a laser having a wavelength of 530 nm or less from the side of the recording layer to the side of a light reflecting layer. Specifically, the above-mentioned documents propose a method for recording and replaying information by irradiating an optical disk with a blue laser (wavelength: 430 nm or 488 nm) or a blue green laser (wavelength: 515 nm), which optical disk comprises a dye such as a porphyrin compound, an azo dye, a metallic azo dye, a quinophthalone dye, a trimethinecyanine dye, a dye having a dicyanovinylphenyl skelton, a coumarin compound, a naphthalocyanine compound, an oxazole compound and the like for a recording layer provided thereon.

According to the studies done by the present inventors, it has been found that the optical disks disclosed in the above-mentioned documents still require further improvements since they are still not sufficient in recording properties such as sensitivity during practical use, reflectance, modulation and the like.

Therefore, provision of an optical information recording medium, wherein information can be recorded and from which the information can be replayed by irradiating a laser having a shorter wavelength than those for a CD-R and a DVD-R, such as a laser having a wavelength of no more than 440 nm, specifically a highly-versatile semiconductor laser having a wavelength of near 405 nm (more specifically, in a range of 405 to 410 nm), and has superior recording properties (high sensitivity, high reflectance, high modulation), has been required.

Furthermore, provision of a method for recording information at high density by using an optical information recording medium comprising a recording layer comprising a dye compound that shows high sensitivity for a laser having short wavelength, has been specifically required.

SUMMARY OF THE INVENTION

The present inventors have conducted intensive studies and found that an optical information recording medium having good recording and replaying properties, which also shows high sensitivity for a laser having a short wavelength of no more than 440 nm and provides high reflectance and high modulation, can be produced.

Namely, the invention is an optical information recording medium comprising a substrate; and a recording layer provided on the substrate, to which recording layer information can be recorded and from which the information can be replayed by laser irradiation, wherein the recording layer comprises a compound represented by the following general formula (I):

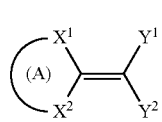

General formula (I)

wherein at least one of $X^1$ and $X^2$ is a hetero atom, and $X^1$ and $X^2$ form a five- or six-membered hetero ring (A);

at least one of $y^1$ and $y^2$ represents —CN, —COR$^1$, —COOR$^2$, —CONR$^3$R$^4$, —SOR$^5$, —SO$_2$R$^6$ or —SO$_2$NR$^7$R$^8$, each of R$^1$ to R$^8$ represnts a hydrogen atom, an alkyl group or an aryl group, and $Y^1$ and $y^2$ may be linked together to form a ring other than a 2-thiohydantoin ring.

Furthermore, the invention is a method for recording information, comprising the step of: irradiating the above-mentioned optical information recording medium with a laser, specifically a laser having a wavelength of no more than 440 nm, to record the information.

Specifically, the optical information recording medium of the invention is preferably in the following embodiments.

(1) The optical information recording medium of the invention is recorded and replayed using a laser having a wavelength of no more than 440 nm, specifically a highly-versatile semiconductor laser having a wavelength of near 405 nm.

(2) In the compound represented by the general formula (I), one of $X^1$ and $X^2$ comprises a nitrogen atom or a sulfur atom.

(3) In the compound represented by the general formula (I), the hetero ring (A) formed by $X^1$ and $X^2$ is a thiazoline ring, an oxazoline ring, a dithiol ring, an imidazoline ring, an indoline ring or a benzo-fused ring thereof. The ring (A) is optionally further fused with other aromatic ring(s).

(4) In the compound represented by the general formula (I), each of $y^1$ and $y^2$ represents —CN, —COR$^1$, —COOR$^2$ or —CONR$^3$R$^4$ and wherein $Y^1$ and $Y^2$ may be linked together to form a ring.

(5) In the compound represented by the general formula (I), the hetero ring (A) formed by $X^1$ and $X^2$ in the compound represented by the general formula (I) is a benzothiazoline ring, a benzoxazoline ring, a benzodithiol ring, an indoline ring or a benzoimidazoline ring, each of which maybe further fused with other aromatic rings.

(6) In the compound represented by the general formula (I), the hetero ring (A) formed by $x^1$ and $X^2$ in the compound represented by the general formula (I) comprises a benzodithiol ring which may be further fused with other aromatic rings.

(7) The optical information recording medium, further comprising a light reflecting layer, which is separate from the recording layer and is formed from a metal.

(8) The optical information recording medium, further comprising a protective layer, which is separate from the recording layer.

(9) In the optical information recording medium, the substrate comprises a transparent disc-shaped substrate having a pregroove with a track pitch of 0.2 to 0.5 μm formed thereon, and the recording layer is provided on a surface of a side of the substrate on which surface the pregroove is formed.

DETAILED DESCRIPTION OF THE INVENTION

The optical information recording medium of the present invention is an optical information recording medium comprising a substrate; and a recording layer provided on the substrate, to which recording layer information can be recorded and from which the information can be replayed by laser irradiation, wherein the recording layer comprises a compound represented by the general formula (I):

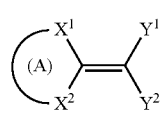

General formula (I)

Hereinafter the compound represented by the general formula (I) according to the invention is explained in detail.

In the general formula (I), at least one of $X^1$ and $X^2$ is a hetero atom, and $X^1$ and $X^2$ form a five- or six-membered hetero ring (A). Either one of $X^1$ and $X^2$ is preferably a nitrogen atom or a sulfur atom. When one of $X^1$ and $X^2$ is a hetero atom, the other includes, but not limited to, such as an alkylene group, an alkenylene group and the like.

The above-mentioned hetero ring (A) includes such as a thiazoline ring, an oxazoline ring, a dithiol ring, an imidazoline ring or a benzo-fused ring thereof, or the following rings. The substituents in the formula are as defined below.

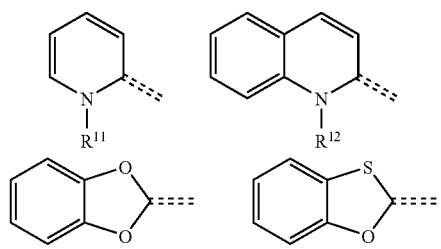

In the above formulae, R$^{11}$ and R$^{12}$ are substituents.

Of these, the hetero ring (A) is preferably a thiazoline ring, an oxazoline ring, a dithiol ring, an imidazoline ring or a benzo-fused ring thereof, more preferably a benzothiazoline ring, a benzoxazoline ring, a benzodithiol ring, an indoline ring or a benzoimidazoline ring, and specifically preferably a benzodithiol ring. The ring is optionally fused with other aromatic ring(s).

The hetero ring (A) optionally has substituent(s) except a hydrogen atom, and the preferred examples of the substituents include an alkyl group having 1 to 20 carbon atom(s), an aryl group having 6 to 14 carbon atoms, an aralkyl group having 7 to 15 carbon atoms, a hetero ring group having 1 to 10 carbon atom(s), an alkoxy group having 1 to 20 carbon atom(s), an aryloxy having 6 to 14 carbon atoms, an alkylsulfinyl having 1 to 20 carbon atom(s), an arylsulfinyl having 6 to 14 carbon atoms, an alkylsulfonyl having 1 to 20 carbon atom(s), an arylsulfonyl having 6 to 14 carbon atoms, an acyl group having 2 to 21 carbon atoms, a carbamoyl group having 1 to 25 carbon atom(s), a sulfamoyl group having 0 to 32 carbon atoms, an alkoxycarbonyl group having 1 to 20 carbon atom(s), an aryloxycarbonyl group having 7 to 15 carbon atoms, an acylamino group having 2 to 21 carbon atoms, a sulfonylamino group having 1 to 20 carbon atom(s), an amino group having 0 to 32 carbon atoms, a cyano group, a nitro group, a hydroxy group, a carboxy group, a sulfo group, an alkylthio having 1 to 32 carbon atom(s), and a halogen atom. Of these, an alkyl group having 3 to 16 carbon atoms, an aryl group having 6 to 10 carbon atoms, an alkoxy group having 3 to 16 carbon atoms, an aryloxy having 6 to 10 carbon atoms are more preferred.

In the general formula (I), at least one of $y^1$ and $y^2$ represents —CN, —COR$^1$, —COOR$^2$, —CONR$^3$R$^4$, —SOR$^5$, —SO$_2$R$^6$ or —SO$_2$NR$_7$R$^8$. Each of R$^1$ to R$^8$ represents a hydrogen atom, an alkyl group or an aryl group.

When each of R$^1$ to R$^8$ is an alkyl group, the carbon atom number is preferably 1 to 20, and more preferably 1 to 5. When each of R$^1$ to R$^8$ is an aryl group, the carbon atom number is preferably 6 to 20, and more preferably 6 to 12. Each of $y^1$ and $y^2$ is preferably —CN, —COR$^1$, —COOR$^2$ or —CONR$^3$R$^4$.

When either $Y^1$ or $y^2$ represents the above-mentioned group, the other includes, but not limited to, such as an alkyl group, an alkenyl group, an aryl group, an alkoxyl group, an amino group and the like.

When $Y^1$ and $y^2$ are each —COR$^1$, —COOR$^2$ or —CONR$^3$R$^4$, each optionally has substituent(s) such as an alkyl group having 1 to 20 carbon atom(s), an aryl group having 6 to 14 carbon atoms, an aralkyl group having 7 to 15 carbon atoms, a hetero ring group having 1 to 10 carbon atom(s), an alkoxy group having 1 to 20 carbon atom(s), an aryloxy having 6 to 14 carbon atoms, an alkylsulfinyl having 1 to 20 carbon atom(s), an arylsulfinyl having 6 to 14 carbon atoms, an alkylsulfonyl having 1 to 20 carbon atom(s), an arylsulfonyl having 6 to 14 carbon atoms, an acyl group having 2 to 21 carbon atoms, a carbamoyl group having 1 to 25 carbon atom(s), a sulfamoyl group having 0 to 32 carbon atoms, an alkoxycarbonyl group having 1 to 20 carbon atom(s), an aryloxycarbonyl group having 7 to 15 carbon atoms, an acylamino group having 2 to 21 carbon atoms, a sulfonylamino group having 1 to 20 carbon atom(s), an amino group having 0 to 32 carbon atoms, a cyano group, a nitro group, a hydroxy group, a carboxy group, a sulfo group and a halogen atom. Of these, an alkyl group having 3 to 16 carbon atoms or an aryl group having 6 to 10 carbon atoms is preferred.

The above-mentioned $y^1$ and $y^2$ may be linked together to form a ring other than a 2-thiohydantoin ring. The ring includes a generally acidic heterocycle such as 2-pyrazolin-5-one, pyrazolidin-3,5-dione, imidazolin-5-one, hydantoin, 4-thiohydantoin, 2-iminoxazolidin-4-one, 2-oxazolin-5-one, 2-thioxazolidin-2,4-dione, isoxazolin-5-one, 2-thiazolin-4-one, thiazolidin-4-one, thiazolidin-2,4-dione, rhodaimne, thiazolidin-2,4-dithione, isorhodamine, indan-1,3-dione, thiophen-3-one, thiophen-3-one-1,1-dioxide, indolin-2-one, indolin-3-one, indazolin-3-one, dithiol-1,3-dione, cyclohexan-1,3-dione, 3,4-dihydroisoquinolin-4-one, 1,3-dioxan-4,6-dione, barbituric acid, 2-thiobarbituric acid, chroman-2,4-dione, or nucleus of pyrido[1,2-a]pyrimidin-1,3-dione, pyrazolo[1,5-b]quinazolone, pyrazolo[5-b]benzimidazole, 1,2,3,4-tetrahydroquinolin-2,4-dione, 3-oxo-2,3-dihydrobenzo[d]thiophene-1,1-dioxide, 3-dicyanomethine-2,3-dihydrobenzo[d]thiophene-1,1-dioxide and the like. Of these, barbituric acid is preferred.

The compound represented by the general formula (I) may form a multimer by linking at any positions. In this case, the units may be the same or different. Alternatively, the compound may be linked to a polymer chain such as of polystyrene, polymethacrylate, polyvinyl alcohol, cellulose and the like.

The compound represented by the general formula (I) may have an electric charge or may be neutral. Whether the compound represented by the general formula (I) is a cation or an anion, or has a neat ionic charge depends on the auxochrome and substituent(s) thereof. When the substituent has a dissociative group, the compound may have a negative group by dissociation of the group, and in this case, the electric charge of the whole molecule is neutralized by any counterion. Typical cation as a counterion includes an inorganic or organic ammonium ion (e.g., a tetraalkylammonium ion, a pyridinium ion) and an alkaline metal ion. In contrast to the above, the anion may specifically be an inorganic anion or an organic anion, and includes such as a halogen anion (e.g., fluoride ion, chloride ion, bromide ion, iodide ion), a substituted arylsulfonate ion (e.g, p-toluenesulfonate ion, p-chlorobenzenesulfonate ion), an aryldisulfonate ion (e.g, 1,3-benzenedisulfonate ion, 1,5-naphthalenedisulfonate ion, 2,6-naphthalenedisulfonate ion), an alkylsulfate ion (e.g., methylsulfate ion), a sulfate ion, a thiocyanate ion, a perchlorate ion, a tetrafluoroboronate ion, a picrylate ion, an acetate ion, a trifluoromethanesulfonate ion.

Furthermore, an electric charge balancing counterion such as an ionic polymer or other dyes having an electeric charge opposite to that of the dye may be used. A metal complex ion (e.g., bisbenzene-1,2-dithiolatonickel(III)) may also be used.

Of the compound represented by the general formula (I) used for the optical information recording medium of the invention, while a specific compound may be used solely, or several compounds having different structures may be used as a mixture, the compound is preferably used solely. The amount of the compound represented by the general formula (I) of the invention to be contained in the recording layer is preferably 50 to 100% by weight, more preferably 75 to 95% by weight relative to the dry mass of the whole recording layer. Furthermore, for the recording layer in the invention, a dye that can be used for conventional optical information recording medium may be used with the compound represented by the general formula (I) of the invention, as long as the effect of the invention is not adversely affected.

Hereinafter the preferred specific examples of the compound (I) used in the invention are listed, which do not limit the invention.

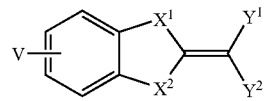

| | X¹ | X² | V | Y¹ | Y² |
|---|---|---|---|---|---|
| S-1 | S | S | H | COCH$_2$CH(CH$_3$)$_2$ | COCH$_3$ |
| S-2 | S | S | H | COCH$_2$CH(CH$_3$)$_2$ | CN |
| S-3 | S | S | H | CONH$_2$ | CONH$_2$ |
| S-4 | S | S | 4,7-OCH(CH$_3$)$_2$ | CN | CN |
| S-5 | S | S | 4,7-OCH$_2$CH$_3$ | CN | CO$_2$CH$_2$CH$_3$ |
| S-6 | S | S | 4,7-OH | CN | CO$_2$CH$_2$CH$_3$ |
| S-7 | S | N—CH$_2$CH$_3$ | H | CN | CO$_2$CH$_3$ |
| S-8 | S | N—CH$_2$CH(CH$_3$)$_2$ | H | CO$_2$CH$_3$ | CO$_2$CH$_3$ |
| S-9 | S | N—CH$_2$CH(CH$_3$)$_2$ | 5-OCH$_3$ | COCH$_2$CH$_3$ | COCH$_2$CH$_3$ |
| S-10 | S | N—CH$_2$CH$_2$CH$_3$ | H | CON(CH$_2$CH$_3$)$_2$ | CON(CH$_2$CH$_3$)$_2$ |
| S-11 | O | N—CH$_2$CH$_3$ | 4,7-O(CH$_2$)$_2$CH$_3$ | COCH$_3$ | COCH$_3$ |
| S-12 | O | N—CH$_2$CH$_3$ | 4,5-benzo | CONH$_2$ | CONH$_2$ |
| S-13 | N—CH$_2$CH$_3$ | N—CH$_2$CH$_3$ | 5,6-benzo | CN | CO$_2$CH(CH$_3$)$_2$ |
| S-14 | N—CH$_2$CH$_2$CH$_3$ | N—CH$_2$CH$_2$CH$_3$ | 5-SCH$_3$ | CN | CN |
| S-15 | S | S | 4,7-OCH$_3$ | CN | CF$_3$ |

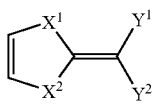

| | X$_1$ | X$_2$ | Y$_1$ | Y$_2$ |
|---|---|---|---|---|
| S-16 | S | S | CN | CN |
| S-17 | S | N—CH$_2$CH$_3$ | CN | CO$_2$CH$_2$CH$_3$ |
| S-18 | O | N—CH$_3$ | CO$_2$CH$_3$ | COCH$_3$ |
| S-19 | N—CH$_2$CH$_3$ | N—CH$_2$CH$_3$ | COCH$_2$CH$_2$CH$_3$ | COCH$_3$ |
| S-20 | S | S | CN | CF$_3$ |

(S-21)

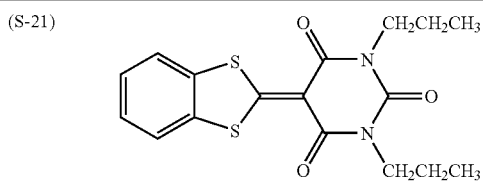

(S-22)

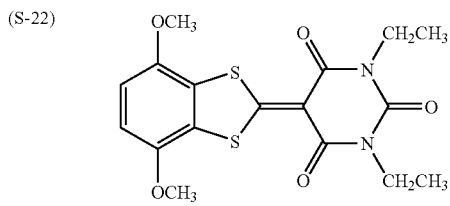

(S-23)

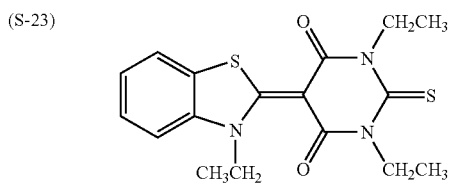

(S-24)

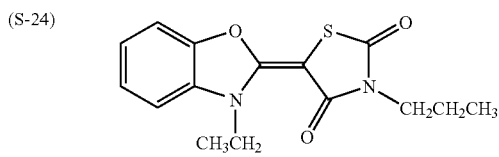

-continued (S-25) 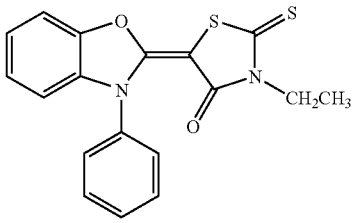

(S-26) 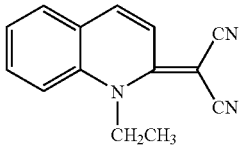

(S-27) 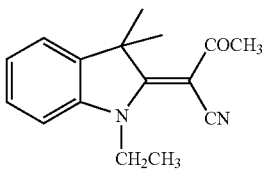

(S-28) 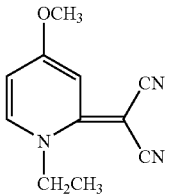

(S-29) 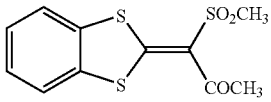

(S-30) 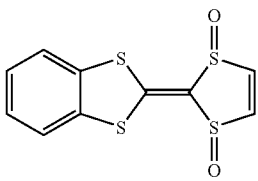

The compound represented by the general formula (I) according to the invention can be synthesized by methods disclosed or referred by, "*Heterocyclic Compounds-Cyanine Dyes and Related Compounds*", edited by F. M. Harmer, published by John Wiley & Sons Inc., New York, London, 1964; "*Heterocyclic Compounds-Special topics in heterocyclic chemistry*", chapter 18, section 14, paragraph 482 to 515, edited by D. M. Sturmer, published by John Wiley & Sons Inc., New York, London, 1977; "*Rodd's Chemistry of Carbon Compounds*", $2^{nd}$ ed., Vol. IV, part B, 1977, chapter 15, paragraph 369 to 422, published by Elsevier Science Publishing Company Inc., New York; and British Patent No. 1,077,611 and the like, or a similar method thereto.

The optical information recording medium of the invention has a recording layer containing the above-mentioned compound represented by the general formula (I) on a substrate. The optical information recording medium of the invention includes those having various constitutions. The optical information recording medium of the invention preferably has a constitution comprising a disc-shaped substrate on which a pregroove having a specific track pitch has been formed, and a recording layer, a light reflecting layer and a protective layer being provided on the substrate in this order, or a constitution having a light reflecting layer, and a recording layer and a protective layer being provided on the substrate in this order. Alternatively, a constitution in which two laminates, each of which comprises a transparent disc-shaped substrate on which a pregroove having a specific track pitch has been formed, and a recording layer and a light reflecting layer being provided on the substrate, have been adhered so that the both recording layers are facing inside, is also preferred.

For the optical information recording medium of the invention, a substrate on which a pregroove having a track pitch narrower than that for a CD-R and a DVD-R has been formed, can be used in order to achieve higher recording density. In the case of the optical information recording medium of the invention, the track pitch is preferably in a range of 200 to 800 nm, more preferably in a range of 200 to 500 nm, and especially preferably in a range of 250 to 350 nm.

The depth of the pregroove is preferably in a range of 5 to 150 nm, more preferably in a range of 10 to 100 nm, and especially preferably in a range of 20 to 50 nm.

The width between the adjacent pregrooves is preferably in a range of 50 to 400 nm, more preferably in a range of 800 to 300 nm, and especially preferably in a range of 100 to 250 nm.

Hereinafter a production method for the optical information recording medium of the invention comprising a disc-shaped substrate, and a recording layer, a light reflecting layer and a protective layer being provided on the substrate in this order, is exemplified.

The substrate for the optical information recording medium of the invention can be optionally selected from various materials used for substrates for the conventional optical information recording media. The material for the substrate may include, for example, glass, acrylic resins such as polycarbonate, polymethyl methacrylate and the like, vinyl chloride resins such as polyvinyl chloride, vinyl chloride copolymer and the like, epoxy resins, amorphous polyolefins, polyesters and the like. If desired, two or more of them can be used in combination. These materials can be used as a film or a rigid substrate. Of these materials, polycarbonate is preferred in view of moisture resistance, dimensional stability, cost and the like.

The surface of the substrate on which the recording layer is provided may have an undercoat layer aiming at improving planarity, increasing adhesiveness and preventing degradation of the recording layer. The material for the undercoat layer may include, for example, polymer materials such as polymethyl methacrylate, acrylic acid/methacrylic acid copolymer, styrene/maleic anhydride copolymer, polyvinyl alcohol, N-methylol acrylamide, styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene, polycarbonate and the like, and surface modifiers such as silane coupling agent and the like. The undercoat layer can be formed by preparing an application solution by dissolving or dispersing the above substance in a suitable solvent, and applying the application solution on the surface of the substrate by an application method such as spin coating, dip coating, extrusion coating and the like. The thickness of the undercoat layer is generally in a range of 0.005 to 20 μm, preferably in a range of 0.01 to 10 μm.

While the recording layer can be formed by methods such as deposition, spattering, chemical vapor deposition (CVD), application of a solvent and the like, application of a solvent is preferred. In this method, an application solution is prepared by dissolving the compound represented by the general formula (I), and optionally a quencher, a binder and the like in a solvent, applying the application solution onto the surface of a substrate to form a coating film and drying.

The solvent for the application solution may include esters such as butyl acetate, ethyl lactate, cellosolve acetate and the like; ketones such as methyl ethyl ketone, cyclohexanone, methyl isobutyl ketone and the like; chlorinated hydrocarbons such as dichloromethane, 1,2-dichloroethane, chloroform and the like; amides such as dimethylformamide and the like; hydrocarbons such as methylcyclohexane and the like; ethers such as dibutylether, diethylether, tetrahydrofuran, dioxane and the like; alcohols such as ethanol, n-propanol, isopropanol, n-butanol, diacetone alcohol and the like; fluorinated solvents such as 2,2,3,3-tetrafluoropropanol and the like; glycol ethers such as ethyleneglycol monomethyl ether, ethyleneglycol monoethyl ether, propyleneglycol monomethyl ether and the like, and the like. One of the solvents can be solely used, or two or more of the solvents can be used in combination, in consideration of the solubility of the dye to be used. The application solution may further include additives such as an antioxidant, a UV absorber, a plasticizer, a lubricant and the like according to the purpose.

When a binder is used during the formation of the recording layer by applying the solvent, the binder may include natural organic polymers such as gelatin, cellulose derivatives, dextran, rosin. rubber and the like; and synthetic organic polymers such as hydrocarbon resins such as polyethylene, polypropylene, polystyrene, polyisobutylene and the like, vinyl resins such as polyvinyl chloride, polyvinylidene chloride, polyvinyl chloride/polyvinyl acetate copolymer and the like, acrylic resins such as polymethylacrylate, polymethylmethacrylate and the like, polyvinyl alcohols, chlorinated polyethylenes, epoxy resins, butyral resins, rubber derivatives, initial condensates of thermosetting resins such as phenol-formaldehyde resins and the like. When the binder is used as a material of the recording layer, the amount to be used of the binder is generally in a range of the amount of 0.01-fold to 50-fold (mass ratio), preferably in a range of 0.1-fold to 5-fold (mass ratio) relative to the dye (inclusive of the compound represented by the general formula (I) of the invention, and so forth). The concentration of the dye in the thus-prepared application solution is generally in a range of 0.01 to 10% by weight, preferably in a range of 0.1 to 5% by weight.

The method for application may include spraying, spin coating, dipping, roll coating, blade coating, doctor roll, screen printing and the like. The recording layer may be either a monolayer or a laminate. The thickness of the recording layer is generally in a range of 20 to 500 nm, preferably 30 to 300 nm, and more preferably 50 to 150 nm.

The recording layer may include various agents for preventing color deterioration in order to improve the light stability of the recording layer. As the agent for preventing color deterioration, a singlet oxygen quencher is generally used. As the singlet oxygen quencher, those disclosed in the known documents such as patent publications and the like can be used. Specific examples thereof include those disclosed in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995, 4-25492, Japanese Patent Application Publication (JP-B) Nos. 1-38680 and 6-26028, German Patent No. 350399, and Journal of Chemical Society of Japan, Oct. 1992, pp.1141, and the like. Preferred example of the singlet oxygen quencher may include a compound represented by the following general formula (A):

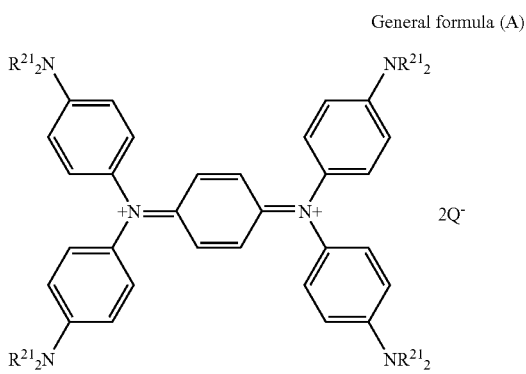

General formula (A)

wherein $R^{21}$ is an alkyl group optionally having substituent(s) and $Q^-$ is an anion.

In the general formula (A), $R^{21}$ is generally an alkyl group having 1 to 8 carbon atom(s) that may be substituted, preferably an unsubstituted alkyl group having 1 to 6 carbon atom(s). The substituents for the alkyl group may include a halogen atom (e.g., F, Cl), an alkoxy group (e.g., methoxy, ethoxy), an alkylthio group (e.g., methylthio, ethylthio), an acyl group (e.g., acetyl, propionyl), an acyloxy group (e.g., acetoxy, propionyloxy), a hydroxy group, an alkoxycarbonyl group (e.g., methoxycarbonyl, ethoxycarbonyl), an alkenyl group (e.g., vinyl), an aryl group (e.g., phenyl, naphthyl) and the like. Of these, a halogen atom, an alkoxy group, an alkylthio group and an alkoxycarbonyl group are preferred. Preferred examples of the anion $Q^-$ may include $ClO_4^-$, $AsF_6^-$, $BF_4^-$, and $SbF_6^-$.

Examples of the compound represented by the general formula (A) are listed in Table 1.

TABLE 1

|  | $R^{21}$ | $Q^-$ |
| --- | --- | --- |
| II-1 | $CH_3$ | $ClO_4^-$ |
| II-2 | $C_2H_5$ | $ClO_4^-$ |
| II-3 | $n\text{-}C_3H_7$ | $ClO_4^-$ |
| II-4 | $n\text{-}C_4H_9$ | $ClO_4^-$ |
| II-5 | $n\text{-}C_5H_{11}$ | $ClO_4^-$ |
| II-6 | $n\text{-}C_4H_9$ | $SbF_6^-$ |
| II-7 | $n\text{-}C_4H_9$ | $BF_4^-$ |
| II-8 | $n\text{-}C_4H_9$ | $AsF_6^-$ |

The amount to be used of the agent for preventing color deterioration such as the above-mentioned singlet oxygen quencher is generally in a range of 0.1 to 50% by weight, preferably in a range of 0.5 to 45% by weight, more preferably in a range of 3 to 40% by weight, and especially preferably in a range of 5 to 25% by weight, relative to the amount of the dye.

In the optical information recording medium of the invention, it is preferable to provide a light reflecting layer adjacent to the recording layer so that the reflectance during replaying the information can be improved. A light reflective substance, which is a material for the light reflecting layer, is a material having high reflectance to a laser. Examples thereof may include metal(s) and metalloid(s) such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi and the like, or stainless steel. These substances may be used solely, or may be used as a combination of two or more, or may be used as an alloy. Of these, Cr, Ni, Pt, Cu, Ag, Au, Al and stainless steel are preferred. Au metal, Ag metal, Al metal and an alloy thereof are specifically preferred, and Ag metal, Al metal and an alloy thereof are the most preferred. The light reflecting layer can be formed onto the substrate or recording layer, for example, by depositing, spattering or ion plating the above-mentioned light reflective substance. The thickness of the light reflecting layer is generally in a range of 10 to 300 nm, preferably in a range of 50 to 200 nm.

It is preferable to provide a protective layer onto the light reflecting layer or recording layer in order to protect the recording layer and the like physically and chemically. When the invention has the same constitution as the DVD-R type optical information recording medium, i.e., a constitution in which two substrates have been adhered so that the recording layers are facing inside, the provision of the protective layer is not essential. The materials used for the protective layer may include such as inorganic substances such as SiO, $SiO_2$, $MgF_2$ $SnO_2$, $Si_3N_4$ and the like, organic substances such as thermoplastic resins, thermosetting resins, UV curing resins and the like. The protective layer can be formed by laminating a film obtained by extrusion of plastic onto the reflecting layer with an adhesive. The protective layer may also be formed by methods such as vapor deposition, spattering, application and the like. Furthermore, when the protective layer is formed from a thermoplastic resin or a thermosetting resin, it may be formed by preparing an application solution by dissolving the resin in a suitable solvent, applying the application solution and drying. When the protective layer is formed from a UV curing resin, it may be formed by applying the resin as it is or as an application solution in a suitable solution, and irradiating UV light with the resin to allow curing of the resin. The application solution may further include additives such as an antistatic agent, an antioxidant, a UV absorber and the like according to the purpose. The thickness of the protective layer is generally in a range of 0.1 µm to 1 mm. According to the above-mentioned steps, a laminate in which a recording layer, a light reflecting layer and a protective layer have been provided on a substrate, or a laminate in which a light reflecting layer, a recording layer and a protective layer have been provided on a substrate, can be produced.

The method for optically recording information according to the invention is carried out as follows, for example, using the above-mentioned optical information recording medium. Firstly, the optical information recording medium is irradiated with a beam for recording, such as a semiconductor laser from the side of substrate or protective layer while rotating the medium at a fixed line velocity (1.2 to 1.4 m/sec for formatting a CD, 3.84 m/sec for formatting a DVD) or a fixed angle velocity. By this irradiation, the recording layer absorbs the beam to rise the temperature locally, which causes a physical or chemical change (for example, production of a pit) and changes the optical property to allow recording of the information. In the invention, a semiconductor laser having an oscillation wavelength in a range of 390 to 440 nm is preferably used as a beam for recording. More preferable light sources may include a blue-violet semiconductor laser having an oscillation wavelength in a range of 390 to 415 nm, a blue-violet SHG laser having a central oscillation wavelength of 425 nm or 410 nm that has been obtained by reducing the wavelength of an infrared semiconductor laser having a central oscillation wavelength of 850 nm or 820 nm by half, respectively, with a light guide element, and the like. Specifically, a blue-violet semiconductor laser is preferably used in view of recording density. The thus-recorded information can be replayed by irradiating the optical information recording medium with a semiconductor laser from the side of substrate or protective layer while revolving the medium at the above-mentioned fixed line velocity.

EXAMPLES

Hereinafter the present invention is explained in more detail with referring to the Examples, which do not limit the invention.

Example 1

Compound (S-1) was dissolved in dibutylether to give an application solution for forming a recording layer (concentration: 1% by weight). The application solution was applied by spin coating onto the pregroove surface of a polycarbonate substrate (diameter: 120 mm, thickness: 0.6 mm) on which a spiral pregroove (track pitch: 0.4 μm, groove width: 0.2 μm, depth of the groove: 0.05 μm) had been formed by injection molding, to form a recording layer (thickness (in pregroove) about 80 nm).

Silver was then spattered onto the recording layer to form a light reflecting layer having a thickness of about 100 nm. A UV curing resin (trade name: SD 318, manufactured by Dainippon Ink and Chemicals, Incorporated) was applied onto the light reflecting layer and a UV light was irradiated thereto to allow curing to form a protective layer having a layer thickness of 7 μm.

According to the above-mentioned steps, an optical disk of the invention was obtained.

Examples 2 to 10

Optical disks (optical information recording media) of the invention were obtained according to the similar method to that of Example 1 except that the compounds of the following Table 2 were respectively used instead of the compound (S-1). (In each example, the amount used was the same as that of Example Comparative Examples 1 to 4

Optical disks (optical information recording media) for comparison were obtained according to the similar method to that of Example 1 except that the following dye compounds (A) to (D) for comparison were respectively used instead of the compound (S-1). (In each example, the amount used was the same as that of Example 1).

Evaluation as an Optical Disk 1

A 14T-EFM signal was recorded on the obtained optical disk using a blue-violet semiconductor laser having the oscillation wavelength of 405 nm at the linear velocity of 3.5 m/sec, and the recorded signal was replayed. The modulation, groove reflectance and sensitivity at the optimum power were evaluated. The recording and evaluation of the recording properties were carried out by using a disk drive (trade name: DDU1000, manufactured by Pulstec Industrial Co., Ltd.).

The results of the evaluation are shown in the following Table 2.

TABLE 2

| | Dye Compound for Recording Layer | Reflectance for unrecorded portion (%) | Modulation (%) | Sensitivity (mW) |
| --- | --- | --- | --- | --- |
| Example 1 | (S-1) | 65 | 50 | 6.3 |
| Example 2 | (S-2) | 67 | 53 | 6.7 |
| Example 3 | (S-5) | 65 | 59 | 6.9 |
| Example 4 | (S-9) | 63 | 55 | 6.0 |
| Example 5 | (S-10) | 65 | 53 | 6.5 |
| Example 6 | (S-13) | 64 | 51 | 5.3 |
| Example 7 | (S-17) | 66 | 56 | 5.9 |
| Example 8 | (S-18) | 62 | 52 | 5.2 |
| Example 9 | (S-21) | 63 | 57 | 6.0 |
| Example 10 | (S-27) | 66 | 55 | 6.8 |
| Comparative Example 1 | (A) | 45 | 44 | 8.0 |
| Comparative Example 2 | (B) | 50 | 43 | 9.5 |
| Comparative Example 3 | (C) | 52 | 42 | 8.7 |
| Comparative Example 4 | (D) | 5 | 10 | 25.2 |

The results in the Table 2 show that the optical disks of the invention each having a recording layer containing the compound represented by the general formula (I) (Examples 1 to 10) exhibited higher reflectance, higher modulation and higher sensitivity for the blue-violet semiconductor laser compared with those for the comparative optical disks each having a recording layer containing the dye compounds (A) to (D) respectively for comparison (Comparative Examples 1 to 4). Accordingly, it is recognized that an optical disk having high recording properties for a laser having short wavelength can be obtained by using a specific compound represented by the general formula (I) of the invention.

Dye Compounds for Comparison (A): The compound disclosed in the Examples of JP-A No. 7-304256

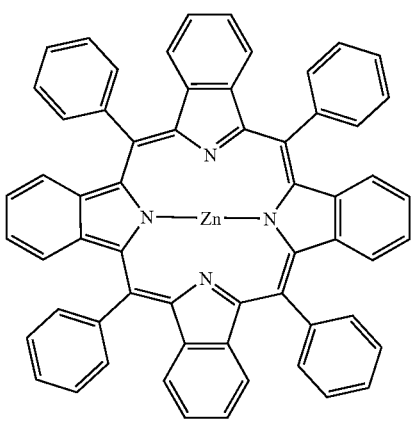

(B): The compound disclosed in the Examples of JP-A No. 2001-39034

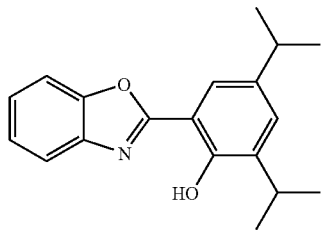

(C) The compound disclosed in the Examples of JP-A No. 2000-280621

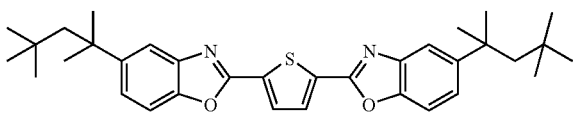

(D) The compound disclosed in the Examples of JP-A No. 5-305772

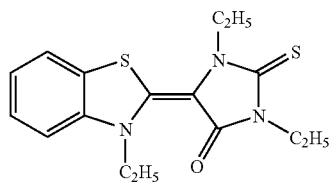

An optical information recording medium having high reflectance, high modulation and high sensitivity for a laser having short wavelength, specifically for a laser having short wavelength of no more than 440 nm, can be obtained by using the compound represented by the general formula (I) characterized by the invention, as a dye. Accordingly, the invention allows recording of information in higher density than that for a CD-R and DVD-R, and an optical information recording media on which information can be recorded in high capacity can be provided.

Furthermore, a method for recording information capable of recording the information at high density by using an optical information recording medium comprising a recording layer comprising a dye compound that shows high sensitivity for a laser having short wavelength, specifically for a laser having short wavelength of no more than 440 nm, can be provided.

What is claimed is:
1. An optical information recording medium comprising a substrate; and
a recording layer provided on the substrate, to which recording layer information can be recorded and from which the information can be replayed by laser irradiation,
wherein the substrate comprises a transparent disc-shaped substrate having a pregroove with a track pitch of 0.2 to 0.5 μm formed thereon, and the recording layer is provided on a surface of a side of the substrate on which surface the pregroove is formed, and wherein the recording layer comprises a compound represented by the following formula

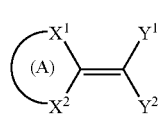

Formula (I)

wherein at least one of $X^1$ and $X^2$ is a hetero atom, and $X^1$ and $X^2$ form a five- or six-membered hetero ring (A) selected from the group consisting of benzothiazoline ring, a benzoxazoline ring, and a benzodithiol ring, each of which may be further fused with other aromatic rings;

$Y^1$ and $Y^2$ are substituents, at least one of $Y^1$ and $Y^2$ represents —CN, —COR$^1$, —COOR$^2$, —CONR$^3$R$^4$, —SOR$^5$, —SO$_2$R$^6$ or —SO$_2$NR$^7$R$^8$, each of $R^1$ to $R^8$ represents a hydrogen atom an alkyl group or an aryl group, and $Y^1$ and $Y^2$ may be linked together to form a ring other than a 2-thiohydantoin ring.

2. The optical information recording medium according to claim 1, wherein the wavelength of the laser is no more than 440 nm.

3. The optical information recording medium according to claim 1, wherein the laser is a semiconductor laser having the wavelength of near 405 nm.

4. The optical information recording medium according to claim 1, wherein one of $X^1$ and $X^2$ in the compound represented by formula (I) comprises a nitrogen atom or a sulfur atom.

5. The optical information recording medium according to claim 1, wherein $Y^1$ and $Y^2$ in the compound represented by formula (I) each represents —CN, —COR$^1$, —COOR$^2$ or —CONR$^3$R$^4$ and $Y^1$ and $Y^2$ may be linked together to form a ring.

6. The optical information recording medium according to claim 1, wherein the hetero ring (A) formed by $X^1$ and $X^2$ in the compound represented by formula (I) comprises a benzodithiol ring which may be further fused with other aromatic rings.

7. The optical information recording medium according to claim 1, further comprising a light reflecting layer, which is separate from the recording layer and is formed from a metal.

8. The optical information recording medium according to claim 1, further comprising a protective layer, which is separate from the recording layer.

9. The optical information recording medium according to claim 1, wherein the hetero ring (A) formed by $X^1$ and $X^2$ in the compound represented by formula (I) comprises a benzothiazoline ring which may be further fused with other aromatic rings.

10. The optical information recording medium according to claim 1, wherein the hetero ring (A) formed by $X^1$ and $X^2$ in the compound represented by formula (I) comprises a benzoxazoline ring which may be further fused with other aromatic rings.

11. The optical information recording medium according to claim 1, wherein $Y^1$ and $Y^2$ in the compound represented by formula (I) each represents —CN, —COR$^1$, —COOR$^2$ or —CONR$^3$R$^4$, wherein Y$^1$ and Y$^2$ are not linked together to form a ring.

12. A method for recording information, comprising the step of: irradiating an optical information recording medium with a laser to record the information; wherein the optical information recording medium comprises:

a substrate; and a recording layer provided on the substrate, to which recording layer information can be recorded and from which the information can be replayed by laser irradiation, wherein the substrate comprises a transparent disc-shaped substrate having a pregroove with a track pitch of 0.2 to 0.5 μm formed thereon, and the recording layer is provided on a surface of a side of the substrate on which surface the pregroove is formed, wherein the recording layer comprises a compound represented by the following formula

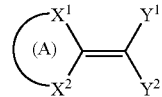

Formula (I)

wherein at least one of X$^1$ and X$^2$ is a hetero atom, and X$^1$ and X$^2$ form a five- or six-membered hetero ring (A) selected from the group consisting of benzothiazoline ring, a benzoxazoline ring, and a benzodithiol ring, each of which may be further fused with other aromatic rings;

Y$^1$ and Y$^2$ are substituents, at least one of Y$^1$ and Y$^2$ represents —CN, —COR$^1$, —COOR$^2$, —CONR$^3$R$^4$, —SOR$^5$, —SO$_2$R$^6$ or —SO$_2$NR$^7$R$^8$, each of R$^1$ to R$^8$ represents a hydrogen atom, an alkyl group or an aryl group, and Y$^1$ and Y$^2$ may be linked together to form a ring other than a 2-thiohydantoin ring.

13. The method according to claim 12, wherein the wavelength of the laser is no more than 440 nm.

* * * * *